US012654786B2

(12) United States Patent
Kim

(10) Patent No.: US 12,654,786 B2
(45) Date of Patent: Jun. 16, 2026

(54) STIFFNESS IMPROVEMENT STRUCTURE OF VEHICLE

(71) Applicants:Hyundai Motor Company, Seoul (KR); Kia Corporation, Seoul (KR)

(72) Inventor: Jong-Min Kim, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 981 days.

(21) Appl. No.: 17/884,741

(22) Filed: Aug. 10, 2022

(65) Prior Publication Data

US 2023/0150589 A1     May 18, 2023

(30) Foreign Application Priority Data

Nov. 16, 2021    (KR) ......................... 10-2021-0157624

(51) Int. Cl.
  *B62D 47/02*      (2006.01)
  *B62D 31/02*      (2006.01)
(52) U.S. Cl.
  CPC ......... B62D 47/025 (2013.01); B62D 31/025 (2013.01)
(58) Field of Classification Search
  CPC .................. B62D 47/025; B62D 21/08; B60Y 2200/143; B60Y 2200/148
  USPC ........................................................ 280/403
  See application file for complete search history.

(56) References Cited

U.S. PATENT DOCUMENTS 2,251,584 A * 8/1941 Fageol ..................... B60D 5/00
                                                          180/24.06

| | | | | |
|---|---|---|---|---|
| 4,405,143 A | * | 9/1983 | Rosenkrands | B60D 5/00 |
| | | | | 280/424 |
| 4,482,165 A | * | 11/1984 | Dawson | B62D 53/0871 |
| | | | | 280/492 |
| 4,502,558 A | * | 3/1985 | Mauri | B60K 17/10 |
| | | | | 180/69.6 |
| 5,452,912 A | * | 9/1995 | Boucquey | B60D 5/00 |
| | | | | 280/424 |

(Continued)

FOREIGN PATENT DOCUMENTS

| | | | | |
|---|---|---|---|---|
| JP | 2016141325 A | * | 8/2016 | |
| JP | 2016175430 A | * | 10/2016 | |

(Continued)

OTHER PUBLICATIONS

JP-2016141325-A translation (Year: 2016).*
JP-2016175430-A translation (Year: 2016).*

*Primary Examiner* — Christopher B Wehrly

(74) *Attorney, Agent, or Firm* — Morgan, Lewis & Bockius LLP

(57) ABSTRACT

A stiffness improvement structure includes a plurality of transverse reinforcement frames formed in parallel to the transverse frame and provided with an interval from each other in a longitudinal direction of the vehicle, and a plurality of longitudinal reinforcement frames formed in parallel to the longitudinal frame and provided with an interval from each other in the width direction of the vehicle, and thus vehicle body stiffness is improved by reinforcing stiffness of a towed portion of a vehicle body being towed and which reinforces stiffness of the vehicle by being provided in a vehicle body including a transverse frame formed in a width direction of the vehicle and a longitudinal frame formed in a longitudinal direction of the vehicle.

16 Claims, 9 Drawing Sheets

(56)  References Cited

U.S. PATENT DOCUMENTS

| | | | | | |
|---|---|---|---|---|---|
| 2010/0244497 | A1* | 9/2010 | Honda | ................. | B62D 23/005 |
| | | | | | 296/205 |
| 2016/0090134 | A1* | 3/2016 | Niu | ..................... | B62D 47/025 |
| | | | | | 180/22 |
| 2016/0280260 | A1* | 9/2016 | Yang | ........................ | B62D 5/14 |
| 2021/0147011 | A1* | 5/2021 | Knook | .................... | B60D 5/00 |
| 2023/0026362 | A1* | 1/2023 | Kim | ....................... | B62D 21/07 |

FOREIGN PATENT DOCUMENTS

| | | | |
|---|---|---|---|
| KR | 10-2016-0070798 | A | 6/2016 |
| KR | 10-2021-0017104 | A | 2/2021 |
| KR | 10-2021-0157624 | A | 12/2021 |

* cited by examiner

STIFFNESS IMPROVEMENT STRUCTURE OF VEHICLE

CROSS-REFERENCE TO RELATED APPLICATIONS

The present application claims priority to Korean Patent Application No. 10-2021-0157624, filed on Nov. 16, 2021, the entire contents of which is incorporated herein for all purposes by this reference.

BACKGROUND OF PRESENT DISCLOSURE

Field of Present Disclosure

The present disclosure relates to a stiffness improvement structure of a vehicle, in which vehicle body stiffness is improved by reinforcing stiffness of a towed portion of a vehicle body being towed.

Description of Related Art

An articulated bus is transportation which increases a transportation capacity by connecting and driving a plurality of vehicle bodies to each other.

In the articulated bus, an articulated unit for connecting the vehicle bodies is provided therebetween.

FIG. 1 illustrates an example of an articulated bus 100 in which a front body 110 and a rear body 120 are connected through an articulated unit 130.

In the articulated unit 130, a first articulated plate 131 provided at a rear end of the front body 110 is hinged to a second articulated plate 132 provided at a front end of the rear body 120. Due to the articulated unit 130, the articulated bus may be easily bent even in a curved section, being driven without departing from a lane.

Meanwhile, in recent years, with the electrification of a vehicle driving device, the spread of the articulated electric bus using a driving motor instead of using an internal combustion engine is also expanding.

The articulated electric bus utilizes a roof of the rear body 120 as a mounting space for a battery B for supplying electric power to the driving motor, and thus there is a problem in that, since a load of the battery B is applied to a front end of the rear body 120, a portion in which the second articulated plate 132 and the rear body 120 are connected is sheared.

The second articulated plate 132 and the rear body 120 are engaged with each other using bolts (see portion A of FIG. 3), and a load is applied to the articulated unit 130 while traveling and transmitted to a rear side of the rear body 120 along a frame of the rear body 120 (see arrow B of FIG. 3). The rear body 120 is formed so that tubes 120 and 121, each having a rectangular cross-section, are provided in a longitudinal direction and a width direction of the rear body 120 and are bonded to each other. However, in the rear body 120, the load is transmitted only through some tubes, and there is no structure for reinforcing stiffness of a portion where different tubes are bonded to each other.

Accordingly, there is a problem in that stress is concentrated in some tubes, and thus the tube forming the rear body 120 is sheared.

Problems in that a connection portion between the second articulated plate 132 and the rear body 120 is sheared or a connection portion of the tube forming the rear body 120 is sheared may occur not only in the articulated electric bus but also in an articulated bus provided with an internal combustion engine.

The information included in this Background of the present disclosure section is only for enhancement of understanding of the general background of the present disclosure and may not be taken as an acknowledgement or any form of suggestion that this information forms the prior art already known to a person skilled in the art.

BRIEF SUMMARY OF PRESENT DISCLOSURE

Various aspects of the present disclosure are directed to providing a stiffness improvement structure of a vehicle, in which a load which acts during traveling on a towed vehicle body, such as a rear body of an articulated bus, is distributed and transmitted, and thus stiffness of a connection portion of a tube is increased to improve stiffness of the rear body.

Other objects and advantages of the present disclosure may be understood by the following description and become apparent with reference to the exemplary embodiments of the present disclosure. Also, it is obvious to those skilled in the art to which the present disclosure pertains that the objects and advantages of the present disclosure may be realized by the means as claimed and combinations thereof.

In accordance with an exemplary embodiment of the present disclosure, there is provided a stiffness improvement structure of a vehicle, which reinforces stiffness of the vehicle by being provided in a vehicle body including a transverse frame formed in a width direction of the vehicle and a longitudinal frame formed in a longitudinal direction of the vehicle, the stiffness improvement structure including: a plurality of transverse reinforcement frames formed in parallel to the transverse frame and provided with an interval from each other in a longitudinal direction of the vehicle, and a plurality of longitudinal reinforcement frames formed in parallel to the longitudinal frame and provided with an interval from each other in the width direction of the vehicle, wherein a front end portion and a rear end portion of each of the longitudinal reinforcement frames are bonded to the transverse frame and the transverse reinforcement frames or bonded to the transverse reinforcement frames spaced from each other, a connection frame coupled to an articulated plate for connecting the body to another body is provided in the transverse frame, and end portions of the longitudinal reinforcement frames, which are engaged with the transverse frame, are bonded at a portion engaged with the connection frame in the transverse frame.

The connection frame may be engaged with the transverse frame provided on a front end portion of the body.

The transverse reinforcement frame may include a first transverse reinforcement frame spaced from the transverse frame, and a second transverse reinforcement frame spaced from the first transverse reinforcement frame toward a rear side of the vehicle, wherein both end portions of each of the first transverse reinforcement frame and the second transverse reinforcement frame may be bonded to the longitudinal frame, and the longitudinal reinforcement frame may be provided between the transverse frame and the first transverse reinforcement frame and between the first transverse reinforcement frame and the second transverse reinforcement frame.

The longitudinal reinforcement frame may include an internal longitudinal reinforcement frame provided adjacent to a center portion of the transverse frame in the width direction, and an external longitudinal reinforcement frame provided toward an external side of the vehicle from the internal longitudinal reinforcement frame.

The internal longitudinal reinforcement frame may include a first internal longitudinal reinforcement frame of which a front end portion is bonded to the transverse frame and of which a rear end portion is bonded to the first transverse reinforcement frame, and a second internal longitudinal reinforcement frame of which a front end portion is bonded to the first transverse reinforcement frame and of which a rear end portion is bonded to the second transverse reinforcement frame, wherein the first internal longitudinal reinforcement frame and the second internal longitudinal reinforcement frame may be provided on an imaginary line formed in the longitudinal direction of the vehicle to form a load transfer path.

The stiffness improvement structure may further include a patch member provided on a portion in which the first internal longitudinal reinforcement frame and the first transverse reinforcement frame are bonded, to reinforce bonding stiffness of the portion.

A width of the patch member may be formed in a range from 50% to 100% of a width of the first internal longitudinal reinforcement frame.

The stiffness improvement structure may further include a patch member provided on a portion in which the second internal longitudinal reinforcement frame is bonded to the first transverse reinforcement frame and the second transverse reinforcement frame to reinforce bonding stiffness of the portion.

A width of the patch member may be formed in a range from 50% to 100% of a width of the second internal longitudinal reinforcement frame.

The external longitudinal reinforcement frame may include a first external longitudinal reinforcement frame of which a front end portion is bonded to the transverse frame and of which a rear end portion is bonded to the first transverse reinforcement frame, and a second external longitudinal reinforcement frame of which a front end portion is bonded to the first transverse reinforcement frame and of which a rear end portion is bonded to the second transverse reinforcement frame, wherein the front end portion of the first external longitudinal reinforcement frame may be bonded to the transverse frame at the external side of the vehicle in the width direction rather than the end portion of the connection frame in the transverse frame, and the first external longitudinal reinforcement frame and the second external longitudinal reinforcement frame may be provided on an imaginary line formed in the longitudinal direction of the vehicle to form a load transfer path.

The stiffness improvement structure may further include a reinforcement member provided on a portion in which the first external longitudinal reinforcement frame is bonded to the first transverse reinforcement frame to distribute stress at the portion.

A length of the reinforcement member may be formed to be greater than a width thereof.

A width of the reinforcement member may be formed to be the same as a width of the first external longitudinal reinforcement frame.

The stiffness improvement structure may further include a patch member provided on a portion in which the second external longitudinal reinforcement frame is bonded to the second transverse reinforcement frame, to reinforce bonding stiffness of the portion.

A width of the patch member may be formed in a range from 50% to 100% of a width of the second external longitudinal reinforcement frame.

The stiffness improvement structure may further include a rear center frame member located on the rear side of the vehicle rather than the second internal longitudinal reinforcement frame and forming a load transfer path together with the first internal longitudinal reinforcement frame and the second internal longitudinal reinforcement frame.

The rear center frame member may be provided on an imaginary line formed in the longitudinal direction of the vehicle together with the first internal longitudinal reinforcement frame and the second internal longitudinal reinforcement frame.

The vehicle may be an articulated bus in which a front body and a rear body thereof are connected through an articulated unit.

The vehicle may be an articulated electric bus which is driven by electric power of a battery.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

BRIEF DESCRIPTION OF THE DRAWINGS

FIG. 8 is an enlarged perspective view exemplarily illustrating a portion to which a patch member is applied according to the stiffness improvement structure of a vehicle according to an exemplary embodiment of the present disclosure.

Figure 9:
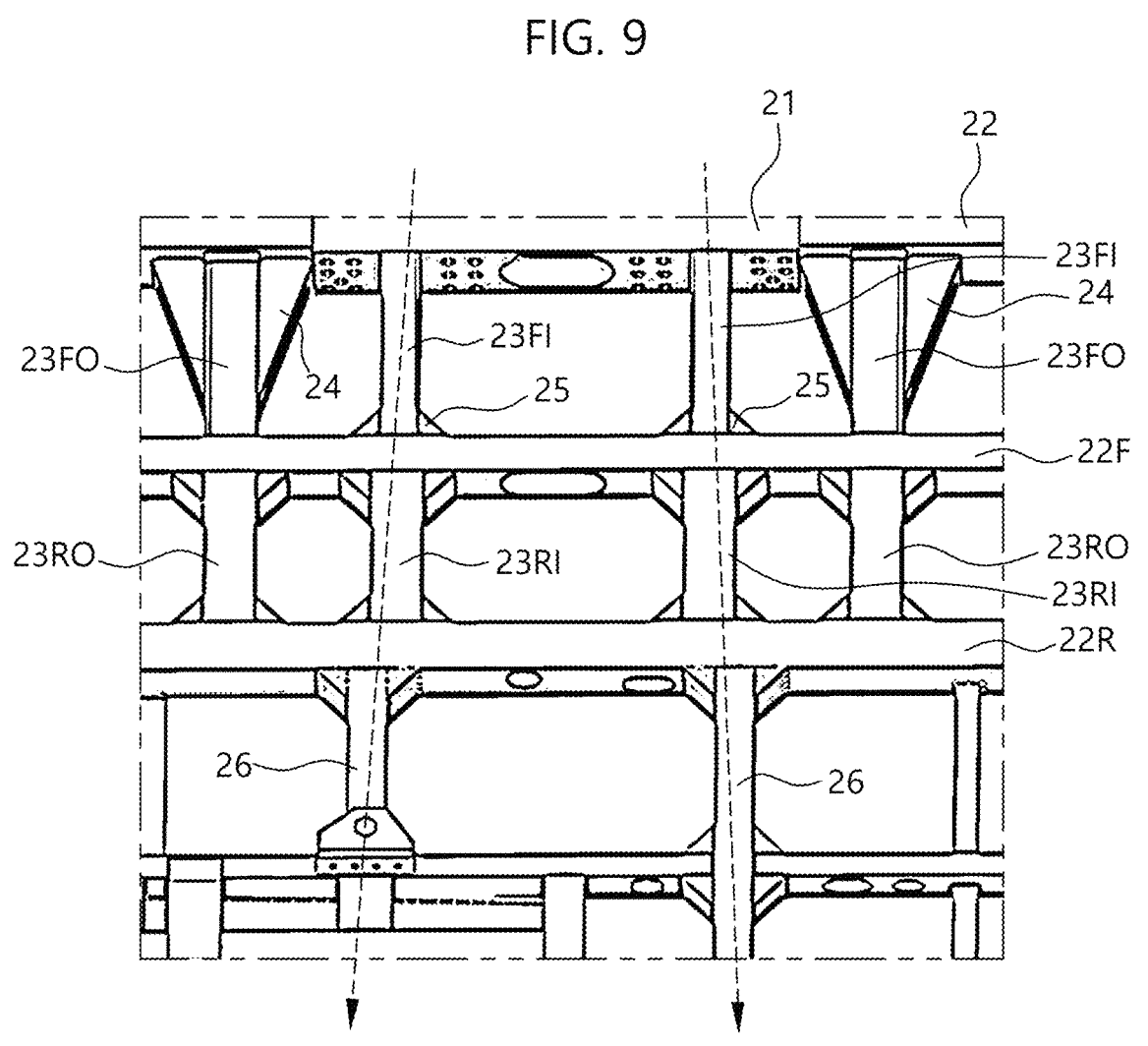

FIG. 9 is a schematic view exemplarily illustrating a path through which a load is transferred from the rear body to a rear center body according to the stiffness improvement structure of a vehicle according to an exemplary embodiment of the present disclosure.

Figure 1:
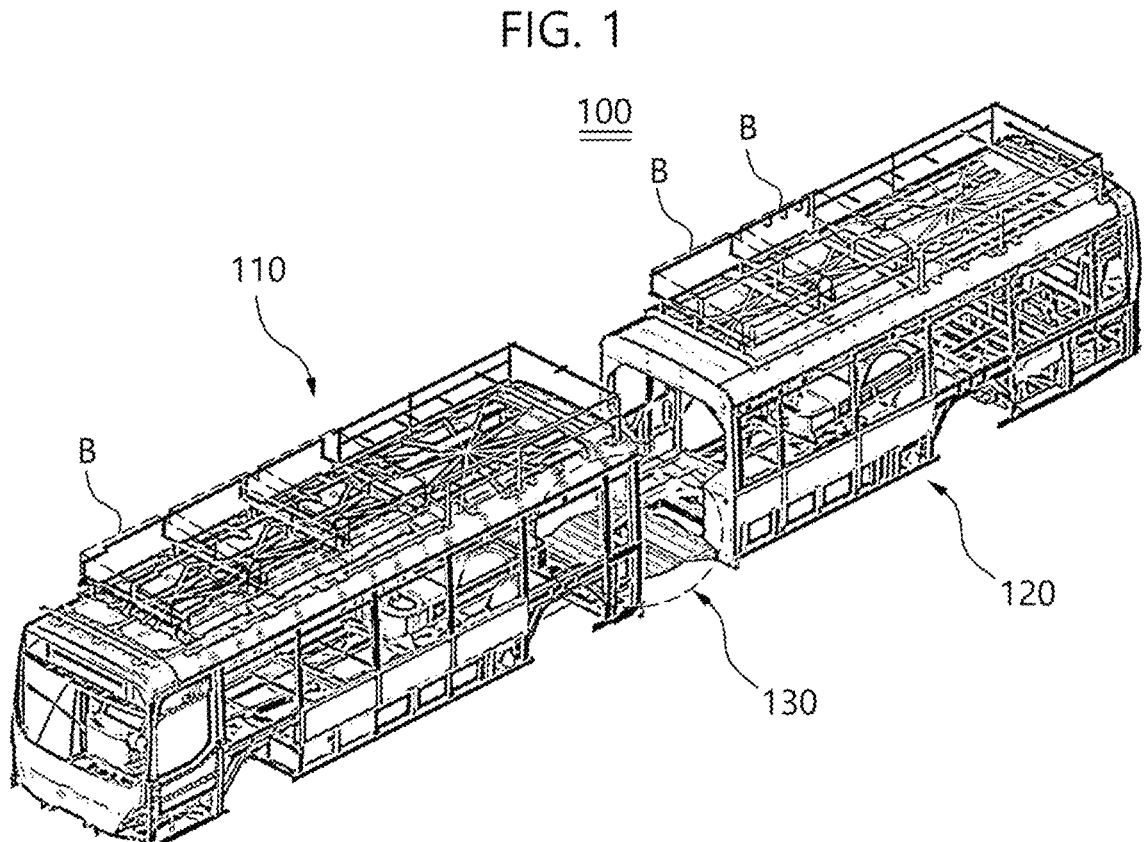
FIG. 1 is a schematic diagram illustrating a related articulated bus.
Figure 2:
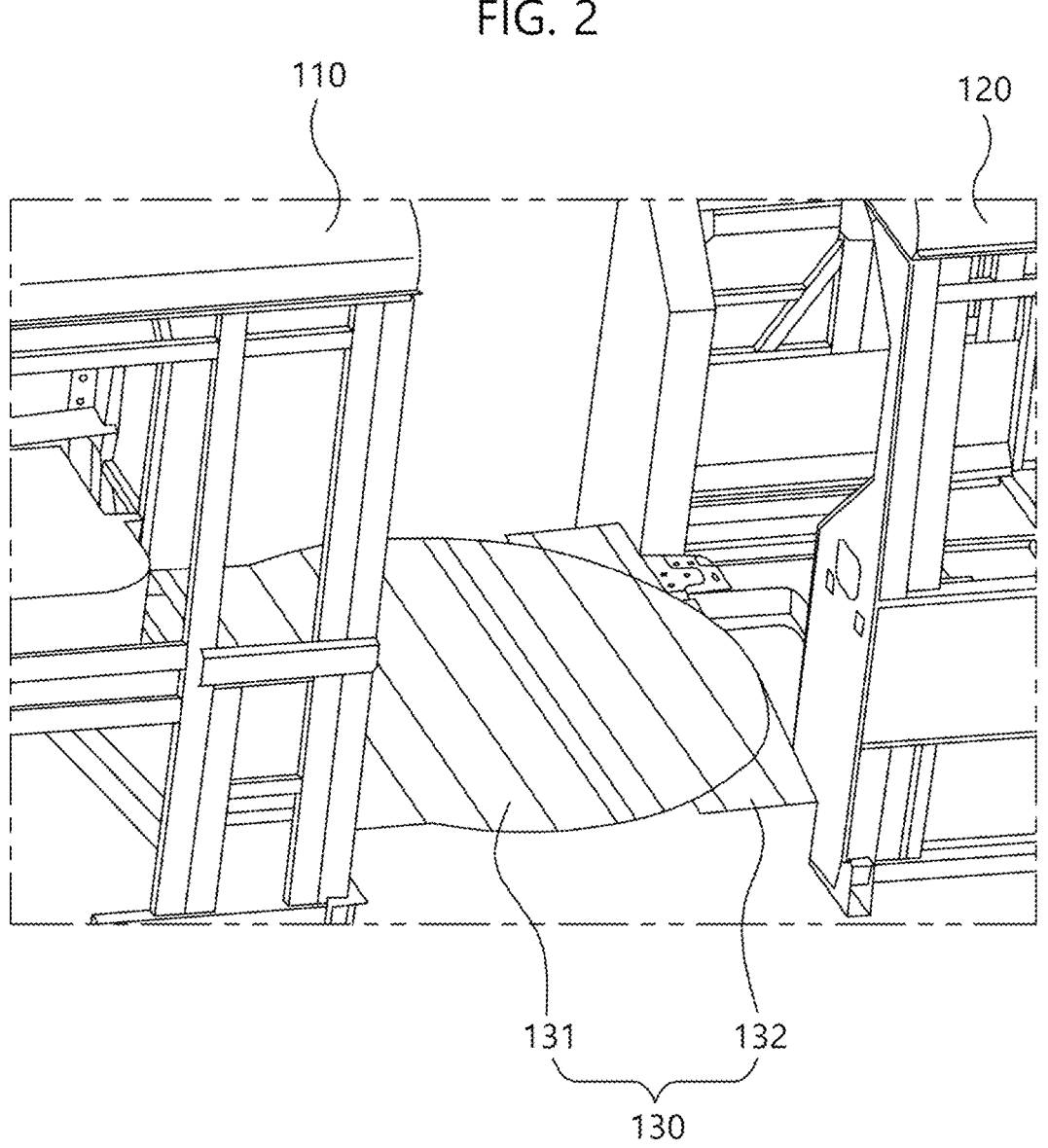
FIG. 2 is a schematic diagram illustrating an articulated unit in the articulated bus.
Figure 3:
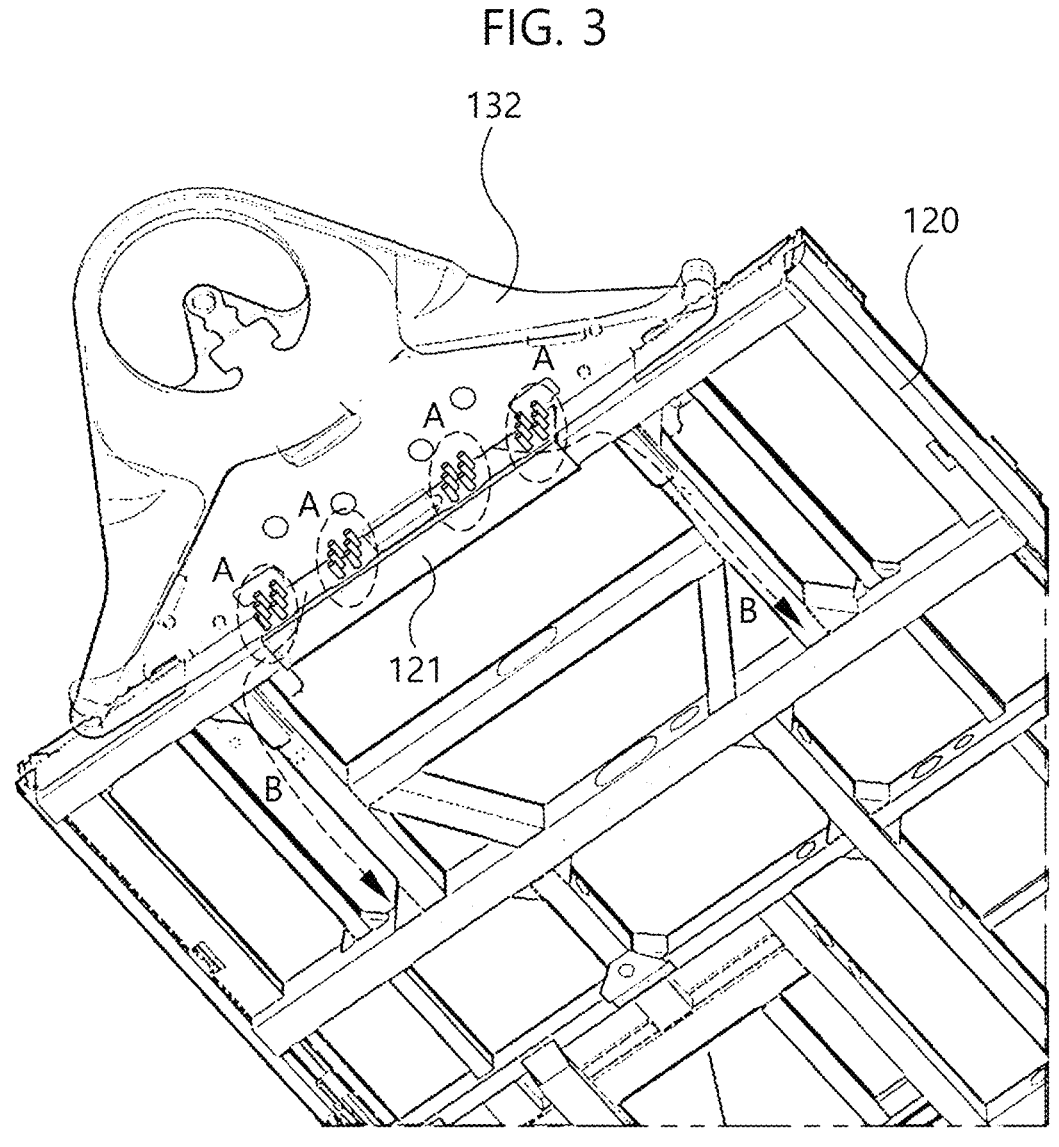
FIG. 3 is a bottom perspective view exemplarily illustrating a rear frame according to the related art.
Figure 4:
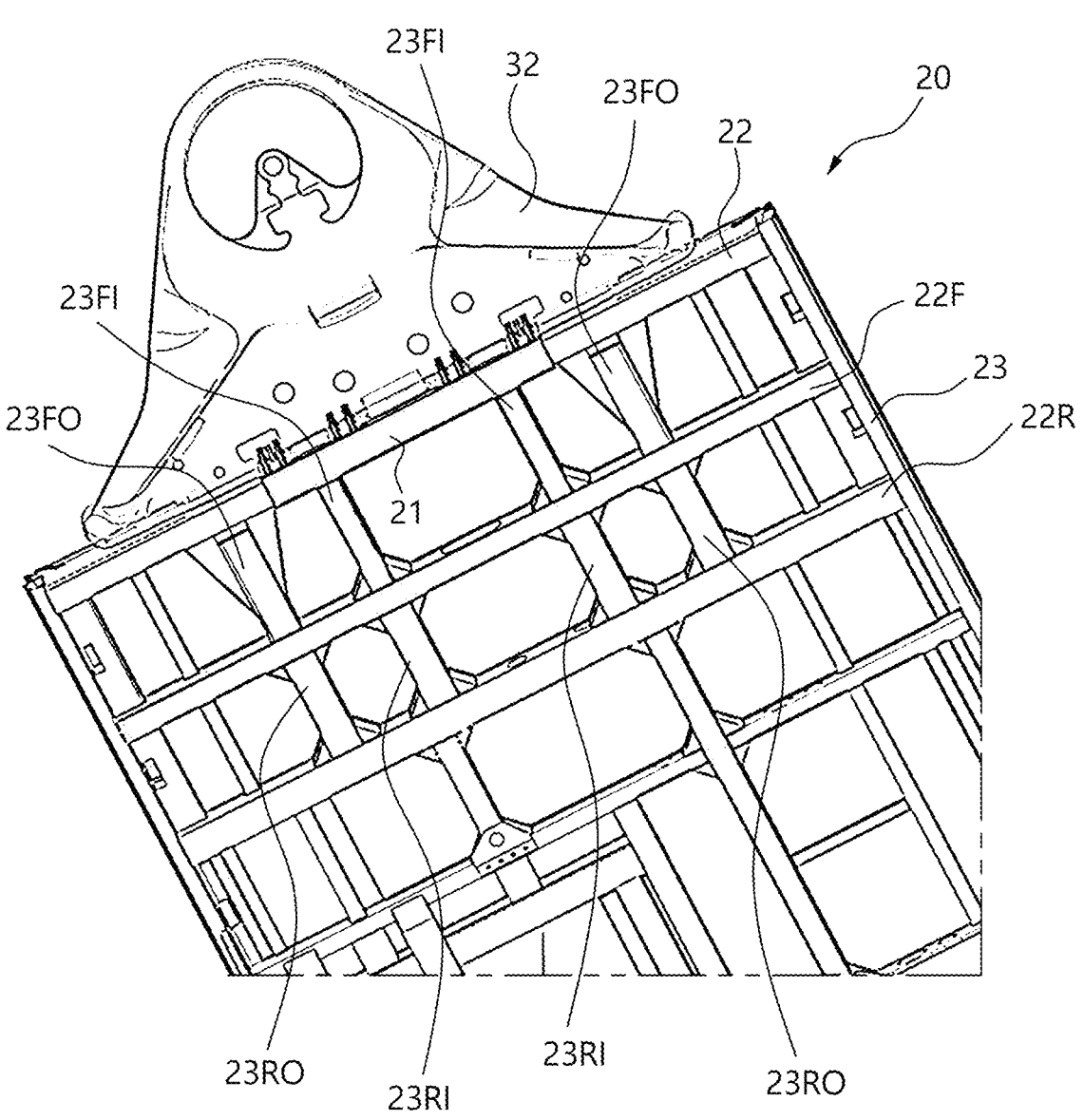
FIG. 4 is a bottom perspective view exemplarily illustrating a rear body to which a stiffness improvement structure of a vehicle is applied according to an exemplary embodiment of the present disclosure.

It may be understood that the appended drawings are not necessarily to scale, presenting a somewhat simplified representation of various features illustrative of the basic principles of the present disclosure. The specific design features of the present disclosure as disclosed herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, a stiffness improvement structure of a vehicle according to an exemplary embodiment of the present disclosure will be described in detail with reference to the accompanying drawings.

The stiffness improvement structure of a vehicle according to an exemplary embodiment of the present disclosure, which reinforces stiffness of the vehicle by being provided in a body 20 of the vehicle including a transverse frame 22 formed in a width direction of the vehicle and a longitudinal frame 23 formed in a longitudinal direction of the vehicle, includes a plurality of transverse reinforcement frames 22F and 22R formed in parallel to the transverse frame 22 and provided with an interval from each other in the longitudinal direction of the vehicle, and a plurality of longitudinal reinforcement frames 23FI, 23FO, 23RI, and 23RO formed in parallel to the longitudinal frame 23 and provided with an interval from each other in the width direction of the vehicle. A front end portion and a rear end portion of each of the longitudinal reinforcement frames 23FI, 23FO, 23RI, and 23RO are bonded to the transverse frame 22 and the transverse reinforcement frames 22F and 22R or bonded to the transverse reinforcement frames 22F and 22R which are spaced from each other. The transverse frame 22 is provided with a connection frame 21 which is engaged with an articulated plate 32 for connecting the body 20 to another body. End portions of the longitudinal reinforcement frames 23FI, 23FO, 23RI, and 23RO, which are engaged with the transverse frame 22, are bonded to portions in which the transverse frame 22 is engaged with the connection frame 21.

The stiffness improvement structure of a vehicle according to an exemplary embodiment of the present disclosure may be applied to an articulated bus in which a front body and the rear body 20 are connected to an articulated unit.

The stiffness improvement structure of a vehicle according to an exemplary embodiment of the present disclosure may be applied to an articulated electric bus which is driven by electric power of a battery.

The stiffness improvement structure of a vehicle according to an exemplary embodiment of the present disclosure is applied to the rear body 20 of the articulated electric bus.

When a front end portion of the rear body 20 is connected to the front body through the articulated unit, a load due to a tow of the front body acts, and because a heavy battery is mounted on an upper portion of the rear body 20, stiffness reinforcement is necessary.

The rear body 20 is formed so that the transverse frame 22 and the longitudinal frame 23 are each provided in the width direction and the longitudinal direction of the vehicle and are bonded to each other to form a basic frame of the rear body 20.

The stiffness improvement structure of a vehicle according to an exemplary embodiment of the present disclosure is applied to inside of the rear body 20 to reinforce stiffness of the rear body 20, is connected to the front body to reinforce stiffness of a front side of the rear body 20 on which the battery is mounted. A connection frame 21 for coupling to the articulated plate 32 of the articulated unit is engaged with the transverse frame 22 of a front end portion of the transverse frame 22 in an intermediate portion of the transverse frame 22 located at the front end portion of the rear body 20. The connection frame 21 is formed to have a predetermined length in the width direction of the vehicle and engaged with the transverse frame 22 in a center portion of the transverse frame 22, and the articulated plate 32 is engaged with the connection frame 21.

The transverse reinforcement frames 22F and 22R are provided parallel to the transverse frame 22. The plurality of transverse reinforcement frames 22F and 22R are provided and provided with an interval from each other in the longitudinal direction of the vehicle.

Furthermore, the longitudinal reinforcement frames 23FI, 23FO, 23RI, and 23RO are provided parallel to the longitudinal frame 23. The plurality of longitudinal reinforcement frames 23FI, 23FO, 23RI, and 23RO are provided and provided in the width direction of the vehicle.

The transverse reinforcement frames 22F and 22R include a first transverse reinforcement frame 22F provided with an interval from the transverse frame 22, and a second transverse reinforcement frame 22R provided with an interval from the first transverse reinforcement frame 22F in a rear side of the vehicle. The first transverse reinforcement frame 22F and the second transverse reinforcement frame 22R are sequentially provided toward the rear side of the vehicle from the transverse frame 22 located on the front end portion of the rear body 20 and transfer a load, which is input to the transverse frame 22 located at the front end portion of the rear body 20, to the first transverse reinforcement frame 22F and the second transverse reinforcement frame 22R.

Both end portions of each of the first transverse reinforcement frame 22F and the second transverse reinforcement frame 22R are bonded to the longitudinal frame 23 by welding.

Since the longitudinal reinforcement frames 23FI, 23FO, 23RI, and 23RO are respectively provided between the transverse frame 22 located at the front end portion of the rear body 20 and the first transverse reinforcement frame 22F and between the first transverse reinforcement frame 22F and the second transverse reinforcement frame 22R, the load input to the front end portion of the rear body 20 passes through the first transverse reinforcement frame 22F and the second transverse reinforcement frame 22R through the longitudinal reinforcement frames 23FI, 23FO, 23RI, and 23RO to be transferred toward the rear end portion of the rear body 20.

The longitudinal reinforcement frames 23FI, 23FO, 23RI, and 23RO include internal longitudinal reinforcement frame 23FI and 23RI provided adjacent to a center portion of the transverse frame 22 in the width direction, and external longitudinal reinforcement frames 23FO and 23RO provided in a direction of an external side of the vehicle from the internal longitudinal reinforcement frame 23FI and 23RI.

The internal longitudinal reinforcement frames 23FI and 23RI include a first internal longitudinal reinforcement frame 23FI of which a front end portion is bonded to the transverse frame 22 and a rear end portion is bonded to the first transverse reinforcement frame 22F, and a second internal longitudinal reinforcement frame 23RI of which a front end portion is bonded to the first transverse reinforcement frame 22F and a rear end portion is bonded to the second transverse reinforcement frame 22R. The first internal longitudinal reinforcement frame 23FI and the second internal longitudinal reinforcement frame 23RI are provided on an imaginary line formed in the longitudinal direction of the vehicle to form the load transfer path.

Furthermore, the external longitudinal reinforcement frames 23FO and 23RO include a first external longitudinal reinforcement frame 23FO of which a front end portion is bonded to the transverse frame 22 and a rear end portion is bonded to the first transverse reinforcement frame 22F, and a second external longitudinal reinforcement frame 23RO of which a front end portion is bonded to the first transverse reinforcement frame 22F and a rear end portion is bonded to the second transverse reinforcement frame 22R. The first external longitudinal reinforcement frame 23FO and the second external longitudinal reinforcement frame 23RO are provided on an imaginary line formed in the longitudinal direction of the vehicle to form the load transfer path.

Figure 5:
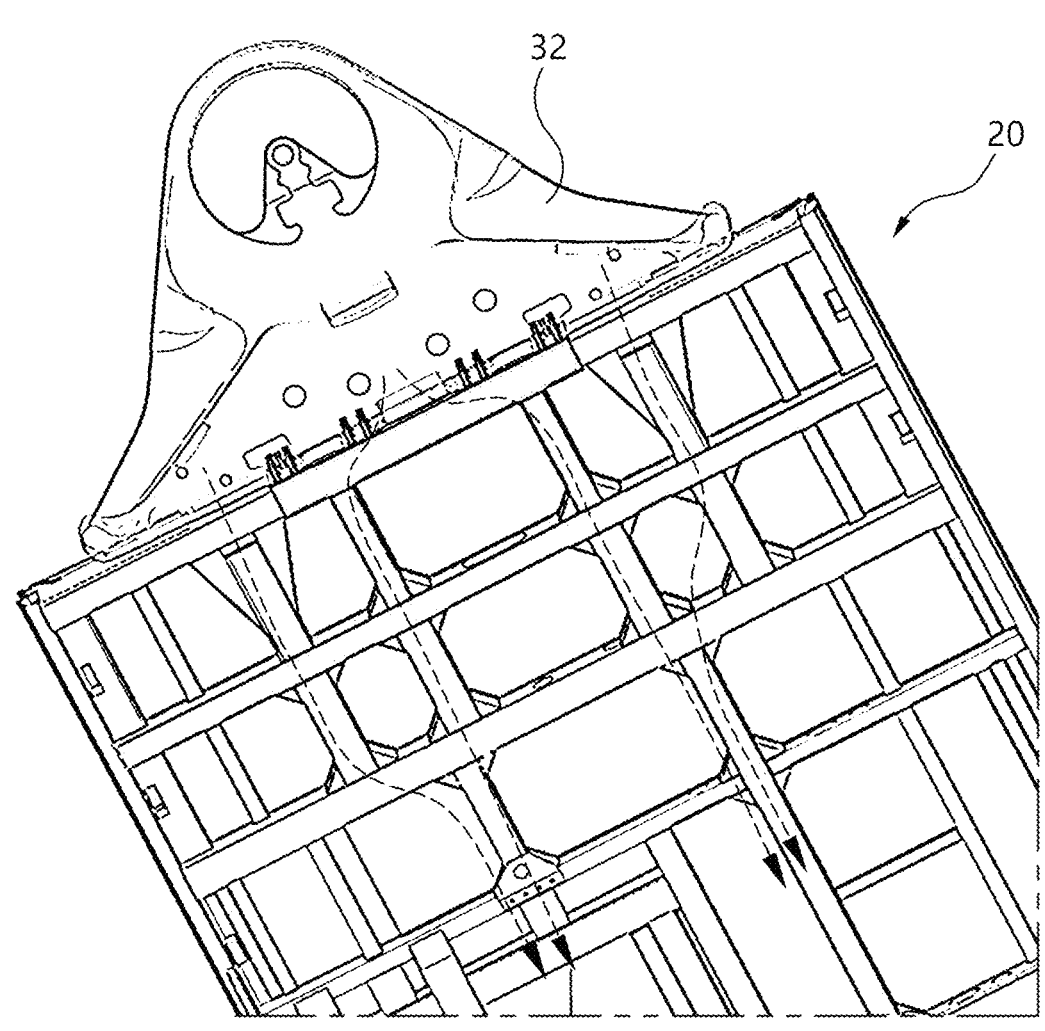
FIG. 5 is a schematic view exemplarily illustrating a load transfer path in the rear body to which the stiffness improvement structure of a vehicle is applied according to an exemplary embodiment of the present disclosure.
Figure 6:
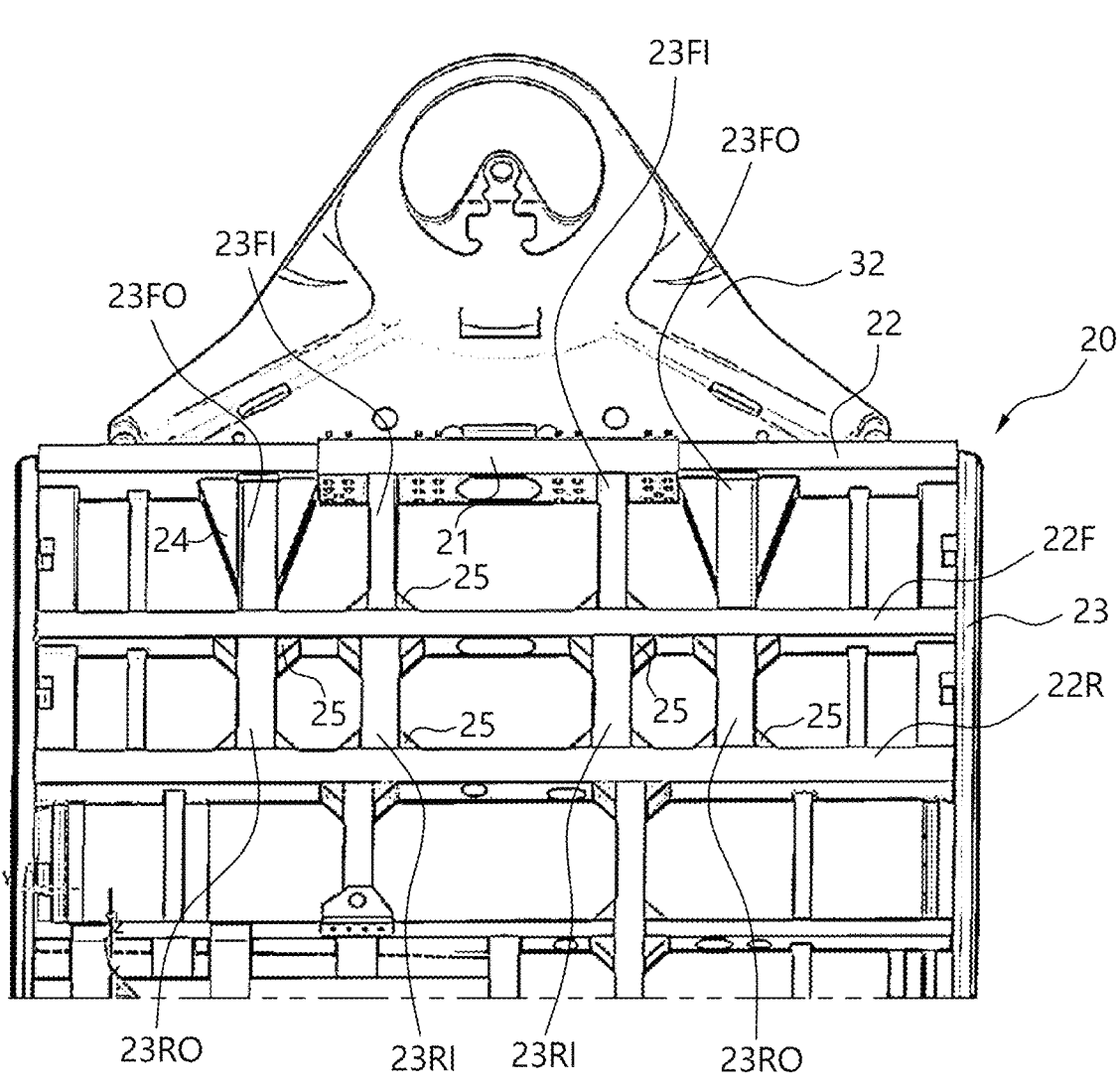
FIG. 6 is a schematic view exemplarily illustrating a state in which a reinforcement member and a patch member are applied according to the stiffness improvement structure of a vehicle according to an exemplary embodiment of the present disclosure.

As shown in FIG. 5, the first internal longitudinal reinforcement frame 23FI, the second internal longitudinal reinforcement frame 23RI, the first external longitudinal reinforcement frame 23FO, and the second external longitudinal reinforcement frame 23RO form load transfer paths to transfer the load input through the transverse frame 22 to the rear body 20 toward the rear side of the vehicle.

The first internal longitudinal reinforcement frame 23FI and the second internal longitudinal reinforcement frame 23RI may be located inside an area in which the connection frame 21 is provided, whereas the first external longitudinal reinforcement frame 23FO and the second external longitudinal reinforcement frame 23RO may be located outside the area in which the connection frame 21 is provided.

The first internal longitudinal reinforcement frame 23FI, the second internal longitudinal reinforcement frame 23RI, the first external longitudinal reinforcement frame 23FO, and the second external longitudinal reinforcement frame 23RO are bonded to the transverse frame 22, the first transverse reinforcement frame 22F, and the second transverse reinforcement frame 22R by welding. The first transverse reinforcement frame 22F, the second transverse reinforcement frame 22R, the first internal longitudinal reinforcement frame 23FI, the second internal longitudinal reinforcement frame 23RI, the first external longitudinal reinforcement frame 23FO, and the second external longitudinal reinforcement frame 23RO are each formed in a form of a tube including a rectangular cross section, and each end portion thereof is bonded by welding.

Meanwhile, to receive the load input from the articulated unit to the rear body 20 through a large area, reinforcement members 24 configured to reinforce bonding stiffness between the external longitudinal reinforcement frames 23FO and 23RO and the transverse frame 22 may be provided in portions in which the external longitudinal reinforcement frames 23FO and 23RO are bonded to the transverse frame 22.

Figure 7:
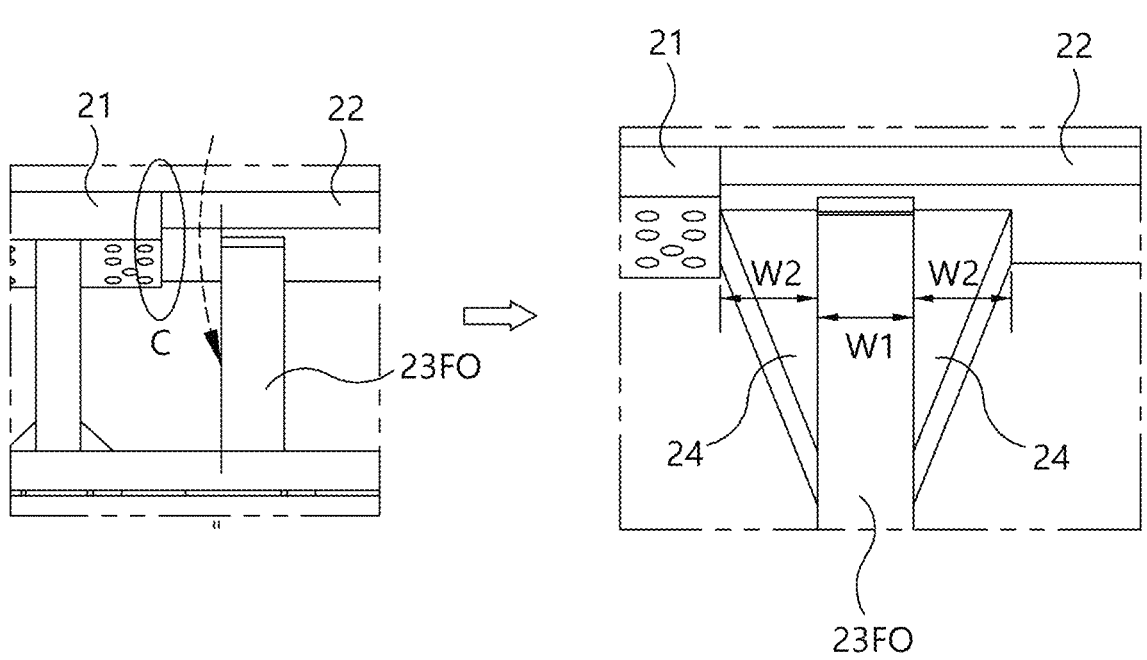
FIG. 7 is an enlarged perspective view exemplarily illustrating a portion to which a reinforcement member is applied according to the stiffness improvement structure of a vehicle according to an exemplary embodiment of the present disclosure.

The reinforcement member 24 is provided in a portion in which the first external longitudinal reinforcement frame 23FO is bonded to the transverse frame 22 to reinforce the bonding stiffness between the first external longitudinal reinforcement frame 23FO and the transverse frame 22. The reinforcement member 24 is formed to connect one side of the first external longitudinal reinforcement frame 23FO to one side of the transverse frame 22. The reinforcement member 24 is formed in a form of a triangle in a plan view; and a length of the reinforcement member 24 is formed to be greater than a width thereof. Furthermore, a width W2 of the reinforcement member 24 is formed to be the same as a width W1 of the first external longitudinal reinforcement frame 23FO. As shown in FIG. 7, when the first external longitudinal reinforcement frame 23FO is bonded to the transverse frame 22 without the reinforcement member 24, stress is concentrated in a bonding portion (an area indicated by C in FIG. 7), and thus shearing may occur. To prevent the shearing, the reinforcement member 24 is provided between the first external longitudinal reinforcement frame 23FO and the transverse frame 22 to distribute the stress.

Furthermore, patch members 25 are provided to increase a welding length, improving the bonding stiffness.

Figure 8:
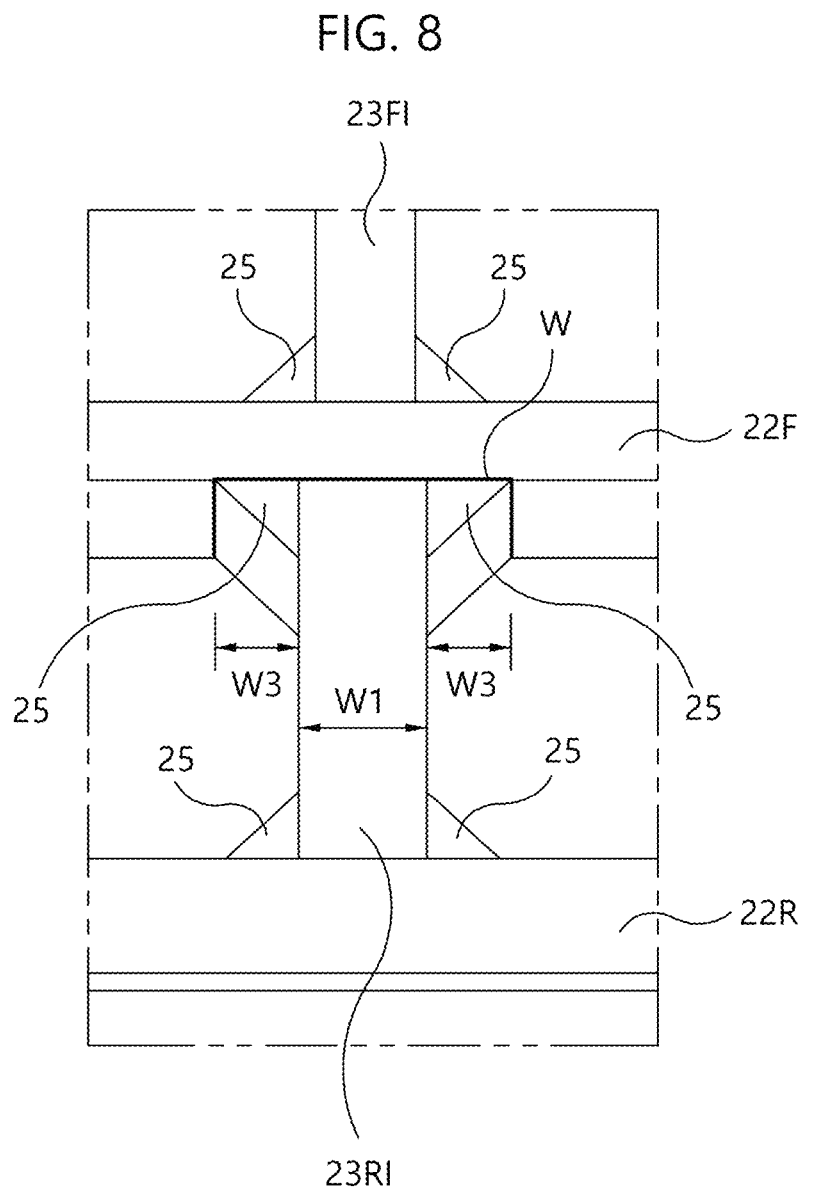

The patch member 25 are provided in a portion in which the first internal longitudinal reinforcement frame 23FI is bonded to the first transverse reinforcement frame 22F, and a portion in which the second internal longitudinal reinforcement frame 23RI and the second external longitudinal reinforcement frame 23RO are bonded to the first transverse reinforcement frame 22F or the second transverse reinforcement frame 22R. For example, as shown in FIG. 8, due to the patch members 25, a welding length of a welding portion W between the second internal longitudinal reinforcement frame 23RI and the first transverse reinforcement frame 22F is increased, and thus the bonding stiffness therebetween is improved. A width W3 of the patch member 25 is formed to be narrower than a width of the first internal longitudinal reinforcement frame 23FI, a width of the second internal longitudinal reinforcement frame 23RI, and the width W1 of the second external longitudinal reinforcement frame. A width W3 of the patch member 25 may be preferable to be at least half, for example, from 50% to 100%, than the width of the first internal longitudinal reinforcement frame 23FI, the width of the second internal longitudinal reinforcement frame 23RI, and the width W2 of the second external longitudinal reinforcement frame.

To stably transfer the load input to the rear body 20 to the rear side of the rear body 20 through the transverse reinforcement frames 22F and 22R and the longitudinal reinforcement frames 23FI, 23FO, 23RI, and 23RO, a rear center frame member 26 is included.

The rear center frame member 26 is located at the rear side of the vehicle rather than the second internal longitudinal reinforcement frame 23RI and forms a load transfer path together with the first internal longitudinal reinforcement frame 23FI and the second internal longitudinal reinforcement frame 23RI.

The rear center frame member 26 is provided on an imaginary line formed in the longitudinal direction of the vehicle together with the first internal longitudinal reinforcement frame 23FI and the second internal longitudinal reinforcement frame 23RI. When the rear center frame member 26 is provided as described above, the load which is input through the first internal longitudinal reinforcement frame 23FI and the second internal longitudinal reinforcement frame 23RI may be stably transferred to the rear side of the rear body 20 through the rear center frame member 26.

In accordance with a stiffness improvement structure of a vehicle according to an exemplary embodiment of the present disclosure, which has the above-described configuration, a reinforcement member is added to a bonding portion between a transverse frame and a longitudinal frame which form a rear body so that stiffness of the rear body may be improved.

Furthermore, during traveling, a transfer path of a load input from an articulated unit is distributed so that it is possible to prevent a phenomenon in which stress is concentrated in a portion of the rear body, preventing the rear body from being sheared.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of predetermined exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A stiffness improvement structure of a vehicle, which reinforces stiffness of the vehicle by being provided in a vehicle body including a transverse frame formed in a width direction of the vehicle and a longitudinal frame formed in a longitudinal direction of the vehicle, the stiffness improvement structure comprising:

a plurality of transverse reinforcement frames formed in parallel to the transverse frame and provided with an interval from each other in the longitudinal direction of the vehicle; and a plurality of longitudinal reinforcement frames formed in parallel to the longitudinal frame and provided with an interval from each other in the width direction of the vehicle, wherein a front end portion and a rear end portion of each of the longitudinal reinforcement frames are bonded to the transverse frame and the transverse reinforcement frames or bonded to the transverse reinforcement frames spaced from each other, wherein a connection frame coupled to an articulated plate for connecting the body to another body is provided in the transverse frame, and wherein the end portions of the longitudinal reinforcement frames, which are engaged with the transverse frame, are bonded at a portion engaged with the connection frame in the transverse frame, wherein the transverse reinforcement frame includes:

a first transverse reinforcement frame of the plurality of transverse reinforcement frames spaced from the transverse frame; and a second transverse reinforcement frame of the plurality of transverse reinforcement frames spaced from the first transverse reinforcement frame toward a rear side of the vehicle, wherein the longitudinal reinforcement frame includes:

an internal longitudinal reinforcement frame provided adjacent to a center portion of the transverse frame in the width direction; and an external longitudinal reinforcement frame provided toward an external side of the vehicle from the internal longitudinal reinforcement frame, wherein the external longitudinal reinforcement frame includes:

a first external longitudinal reinforcement frame of which the front end portion is bonded to the transverse frame and of which the rear end portion is bonded to the first transverse reinforcement frame; and a second external longitudinal reinforcement frame of which the front end portion is bonded to the first transverse reinforcement frame and of which the rear end portion is bonded to the second transverse reinforcement frame, wherein the stiffness improvement structure further includes;

a reinforcement member provided on a portion in which the first external longitudinal reinforcement frame is bonded to the first transverse reinforcement frame to distribute stress at the portion, and a first patch member provided on a portion in which the second external longitudinal reinforcement frame is bonded to the second transverse reinforcement frame, to reinforce bonding stiffness of the portion, wherein a length of the reinforcement member is longer than a length of the first patch member.

2. The stiffness improvement structure of claim 1, wherein the connection frame is engaged with the transverse frame provided on a front end portion of the body.

3. The stiffness improvement structure of claim 2, wherein first and second end portions of each of the first transverse reinforcement frame and the second transverse reinforcement frame are bonded to the longitudinal frame, and wherein at least one of the longitudinal reinforcement frames is provided between the transverse frame and the first transverse reinforcement frame and between the first transverse reinforcement frame and the second transverse reinforcement frame.

4. The stiffness improvement structure of claim 1, wherein the internal longitudinal reinforcement frame includes: a first internal longitudinal reinforcement frame of which the front end portion is bonded to the transverse frame and of which the rear end portion is bonded to the first transverse reinforcement frame; and a second internal longitudinal reinforcement frame of which the front end portion is bonded to the first transverse reinforcement frame and of which the rear end portion is bonded to the second transverse reinforcement frame, wherein the first internal longitudinal reinforcement frame and the second internal longitudinal reinforcement frame are provided on an imaginary line formed in the longitudinal direction of the vehicle to form a load transfer path.

5. The stiffness improvement structure of claim 4, further including:

a second patch member provided on a portion in which the first internal longitudinal reinforcement frame and the first transverse reinforcement frame are bonded, to reinforce bonding stiffness of the portion.

6. The stiffness improvement structure of claim 5, wherein a width of the second patch member is formed in a range from 50% to 100% of a width of the first internal longitudinal reinforcement frame.

7. The stiffness improvement structure of claim 4, further including:

a third patch member provided on a portion in which the second internal longitudinal reinforcement frame is bonded to the first transverse reinforcement frame and the second transverse reinforcement frame to reinforce bonding stiffness of the portion.

8. The stiffness improvement structure of claim 7, wherein a width of the third patch member is formed in a range from 50% to 100% of a width of the second internal longitudinal reinforcement frame.

9. The stiffness improvement structure of claim 1, wherein the front end portion of the first external longitudinal reinforcement frame is bonded to the transverse frame at the external side of the vehicle in the width direction rather than an end portion of the connection frame in the transverse frame, and wherein the first external longitudinal reinforcement frame and the second external longitudinal reinforcement frame are provided on an imaginary line formed in the longitudinal direction of the vehicle to form a load transfer path.

10. The stiffness improvement structure of claim 1, wherein a length of the reinforcement member is formed to be greater than a width of the reinforcement member.

11. The stiffness improvement structure of claim 1, wherein a width of the reinforcement member is formed to be a same as a width of the first external longitudinal reinforcement frame.

12. The stiffness improvement structure of claim 1, wherein a width of the first patch member is formed in a range from 50% to 100% of a width of the second external longitudinal reinforcement frame.

13. The stiffness improvement structure of claim 4, further including:

a rear center frame member located on the rear side of the vehicle rather than the second internal longitudinal reinforcement frame and forming a load transfer path together with the first internal longitudinal reinforcement frame and the second internal longitudinal reinforcement frame.

14. The stiffness improvement structure of claim 13, wherein the rear center frame member is provided on the imaginary line formed in the longitudinal direction of the vehicle together with the first internal longitudinal reinforcement frame and the second internal longitudinal reinforcement frame.

15. The stiffness improvement structure of claim 1, wherein the vehicle is an articulated bus in which the body and the another body thereof are connected through an articulated unit.

16. The stiffness improvement structure of claim 15, wherein the vehicle is an articulated electric bus which is driven by electric power of a battery.

* * * * *